Sept. 6, 1966 G. D. LIPP 3,271,125
GLASS STREAM FEEDER
Filed Oct. 12, 1962 4 Sheets-Sheet 1

INVENTOR.
GEORGE D. LIPP
BY Clarence R. Patty, Jr.
ATTORNEY

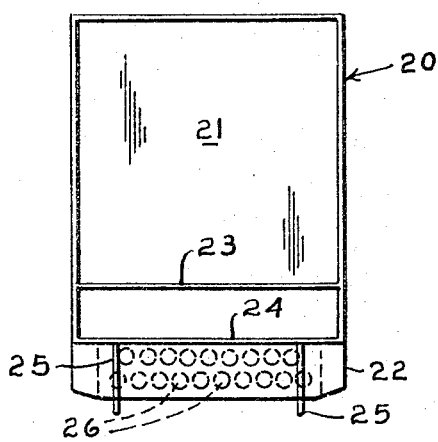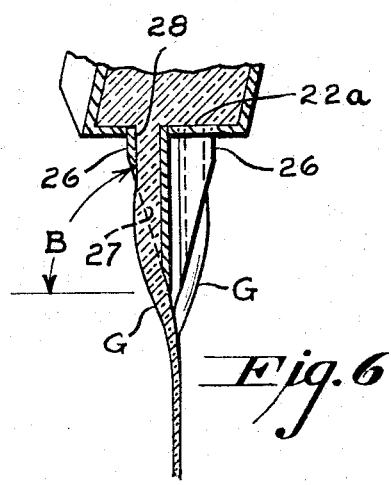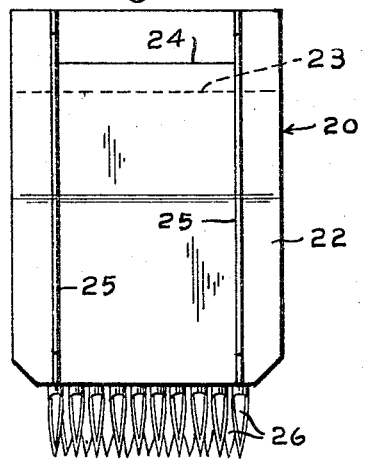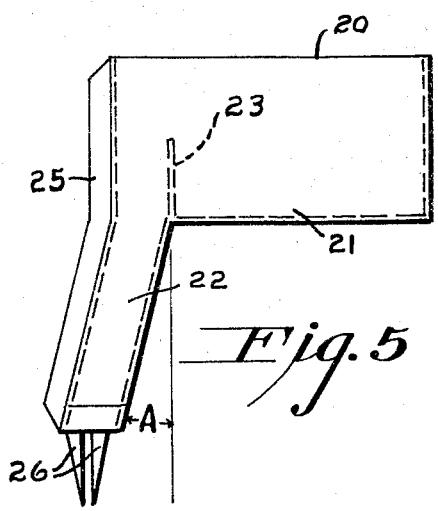

Sept. 6, 1966 G. D. LIPP 3,271,125
GLASS STREAM FEEDER
Filed Oct. 12, 1962 4 Sheets-Sheet 3

INVENTOR.
GEORGE D. LIPP
BY Clarence R. Patty Jr.
ATTORNEY

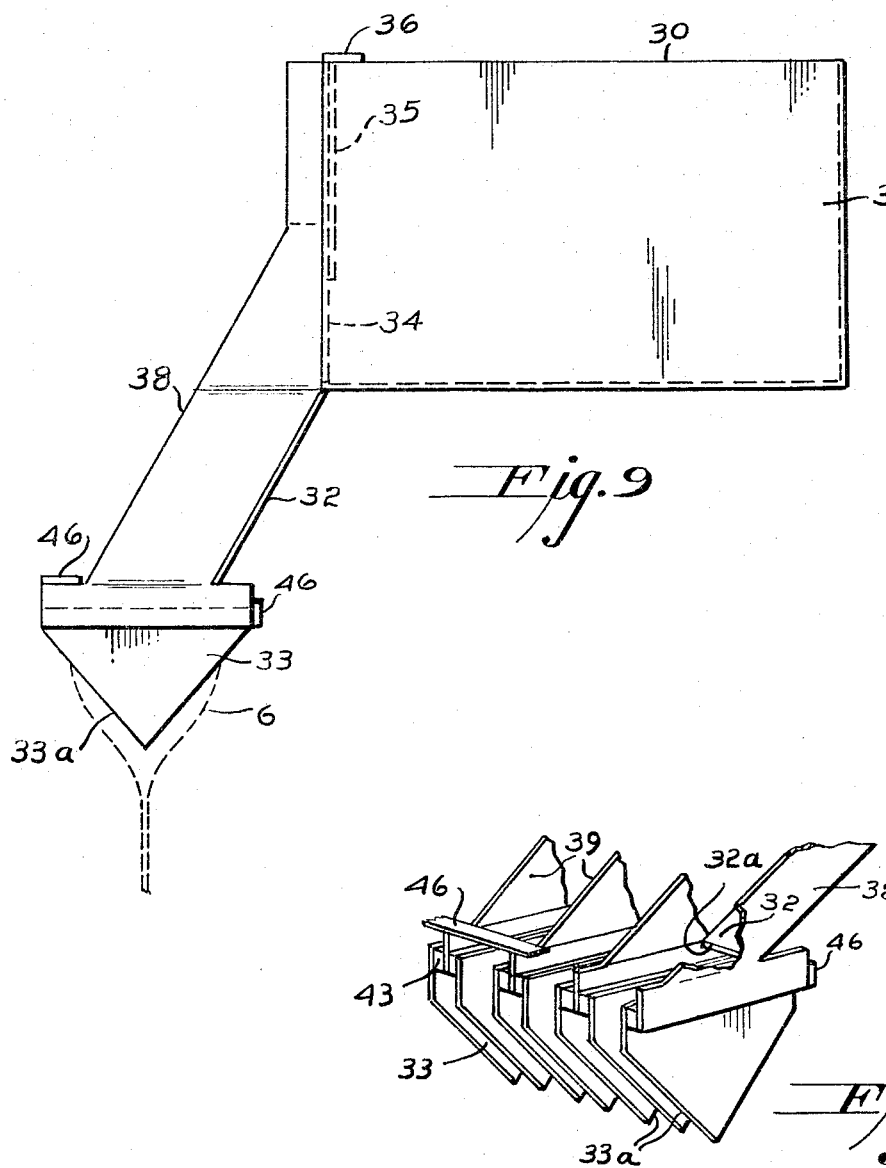

United States Patent Office 3,271,125
Patented Sept. 6, 1966

3,271,125
GLASS STREAM FEEDER
George D. Lipp, Corning, N.Y., assignor to Corning Glass Works, Corning, N.Y., a corporation of New York
Filed Oct. 12, 1962, Ser. No. 230,054
4 Claims. (Cl. 65—145)

This invention relates to improved apparatus and procedure for uniformly feeding molten glass to a forming device, and more particularly to apparatus for delivering a plurality of separated or individual streams of molten glass to the bite of a pair of cooperable rollers so as to maintain a molten pool of uniform depth and predetermined length adjacent the bite of the rollers.

Although the ideal mode of feeding molten glass to a pair of rollers in the roll forming of sheet or ribbon, is to orifice or lip feed the molten glass directly into the bite of the rollers from the exit end of an orifice or lip positioned in close adjacency therewith, such delivery is not always feasible, especially when forming sheet or ribbon from readily devitrifiable glass. In such cases, the cooled forming rollers have a tendency to extract heat from the orifice or delivery lip, resulting in predevitrification of the glass before formation into sheet. Heating elements have been supplied to heat the end of the orifice or lip and avoid predevitrification, however, this solution has not been entirely satisfactory since the added heat in such close adjacency to the cooling rollers has a tendency to heat the rollers resulting in roller warpage and incomplete solidification during formation.

I have found that this problem of predevitrification resulting from the cooling of the orifice or lip can be obviated by positioning the exit end of the orifice or lip in spaced-apart relationship above the bite or contacting line of the rollers. However, due to the fact that readily devitrifiable glasses generally have extremely low viscosity at their liquidus temperatures, wherein the surface tension forces are not hindered by viscosity, it became apparent that the conventonal rectangular-shaped orifices are inoperative for such fluid glasses since such rectangular-shaped delivery contracts to a round stream before reaching the rollers. As a result, a localized pool of glass is formed at the bite which cannot be forced outwardly to the desired width by rolling. In order to obtain a uniform distribution of molten glass across the desired width of the forming rolls, I have found that it is necessary to feed a plurality of separate or individual closely-spaced streams to the bite of the forming rolls, which then form a pool of desired length across the bite of the rollers.

It thus has been an object of my invention to provide improved apparatus for stream feeding molten glass to a pair of forming rolls.

A further object of my invention has been to provide apparatus for delivering a plurality of separate or individual closely-spaced streams of molten glass to a pair of forming rolls so as to produce a continuous uniform pool of desired length adjacent the bite of such rolls.

An additional object of my invention has been to provide improved apparatus for stream feeding low viscosity glass to a pair of forming rolls so as to produce a pool of such molten glass of desired length adjacent the bite of such rolls.

A still further object of my invention has been to provide an improved method of stream feeding low viscosity glass to glass forming means so as to provide a uniform pool of desired length of such glass at the forming means.

These and other objects of my invention will be apparent to those skilled in the art from the following disclosure and accompanying drawings in which:

FIGURE 3 is a top plan view of the device shown in FIGURE 2.

FIGURE 4 is a front elevational view of the device shown in FIGURE 2.

FIGURE 5 is a side elevational view of the device shown in FIGURE 2.

FIGURE 6 is an enlarged fragmental view in section of a portion of the device shown in FIGURE 2.

FIGURE 9 is a side elevational view of the device shown in FIGURE 7.

FIGURE 10 is a fragmental perspective view of a portion of the device shown in FIGURE 7.

Figure 1:
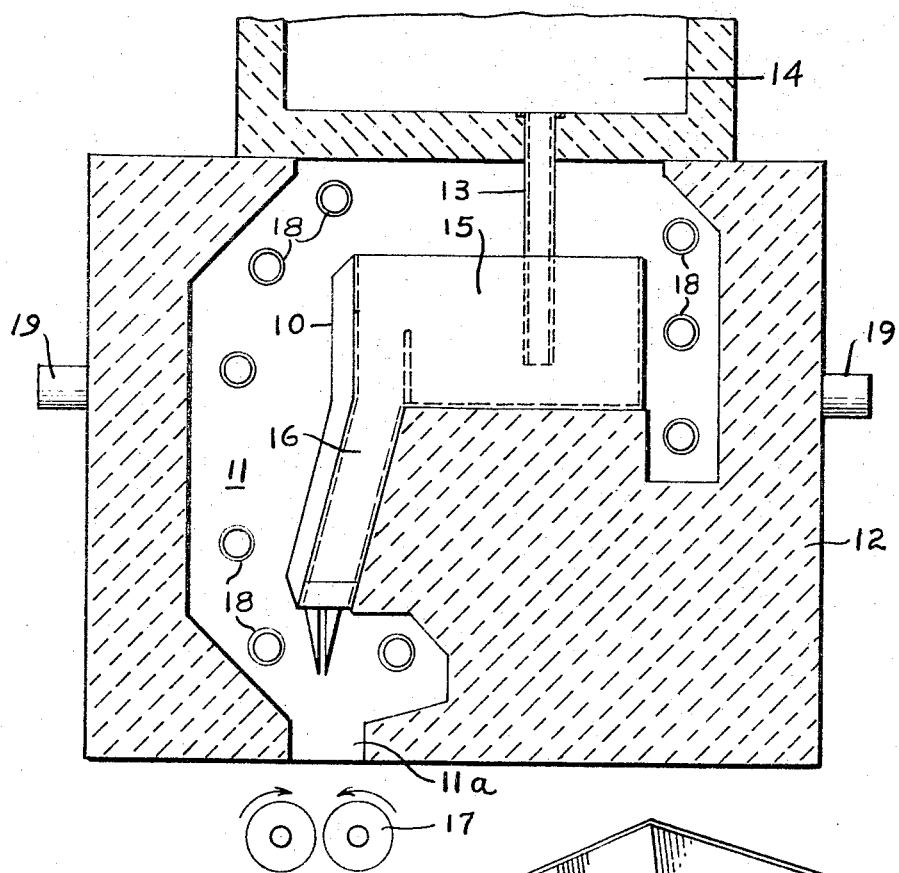
FIGURE 1 is a somewhat schematic side elevational view of apparatus embodying my invention shown in an operating position within a firebox located between a glass source and a pair of forming rolls.
Figure 2:
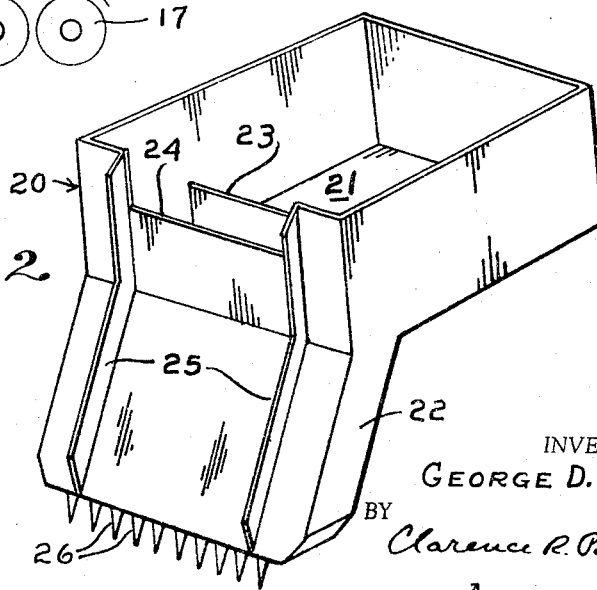
FIGURE 2 is a perspective view of apparatus embodying my invention.
Figure 7:
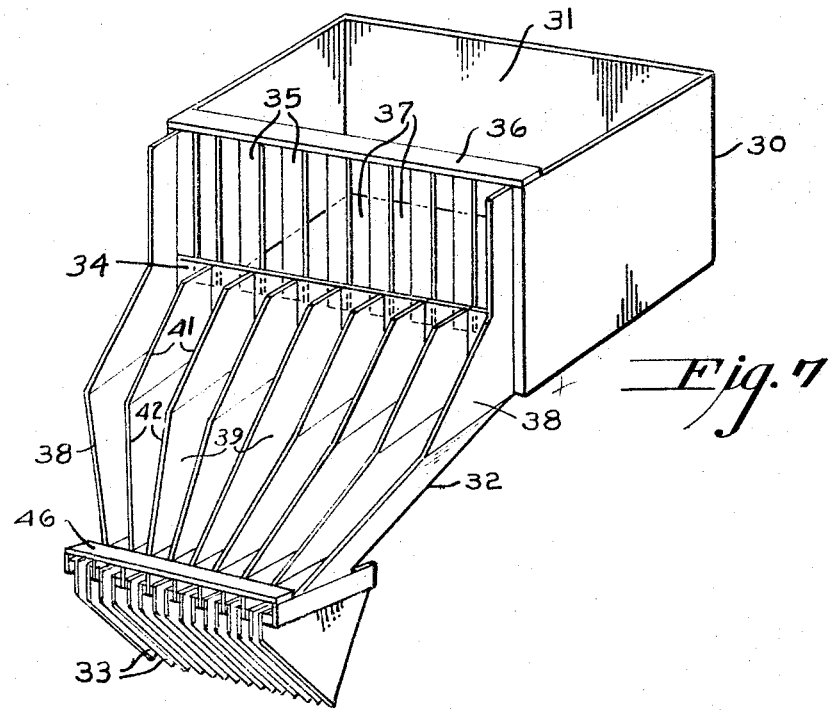
FIGURE 7 is a perspective view of another embodiment of my invention.
Figure 8:
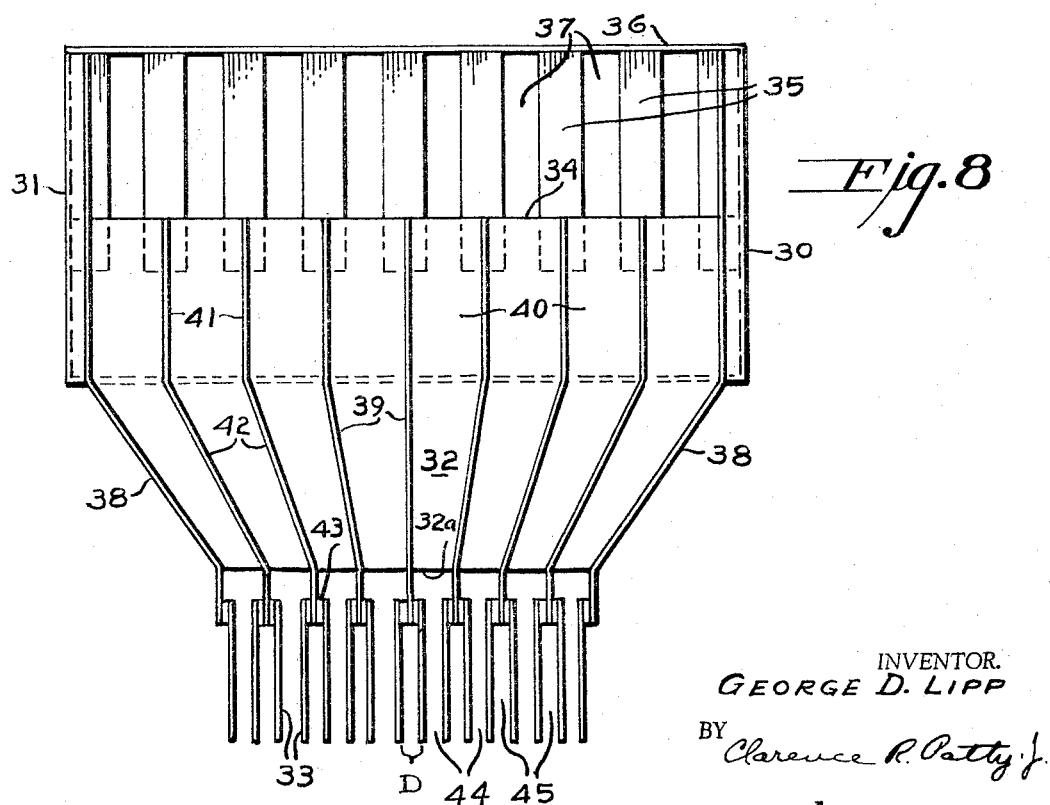
FIGURE 8 is a front elevational view of the device shown in FIGURE 7.

Referring now to the drawings, and particularly FIGURE 1, a stream feeder 10 embodying my invention is shown positioned within a recessed portion 11 of a firebox or refractory housing 12. A delivery tube 13 connected to a source of molten glass 14 delivers such glass to a reservoir basin 15 of the feeder 10, below the surface of the glass retained therein. A downcomer 16, having means secured thereto for separating the molten glass into a plurality of individual streams, feeds the molten glass through a restricted passageway 11a to forming rolls 17 positioned beneath the firebox or refractory housing 12. A plurality of suitable heating units 18 are positioned within the recessed portion 11 of the firebox 12 to maintain the glass in a molten condition during delivery to the forming rolls 17 and thereby prevent predevitrification. A pair of trunnions or pivotal mounting means 19, which may be operated by any suitable means such as a worm gear, are shown secured to the firebox for pivotally suspending the same beneath the glass source 14, for reasons which will become apparent later.

Referring now to the embodiment shown in FIGURES 2–6, inclusive, a stream feeder 20 is shown having a reservoir basin 21 and a downcomer or chute 22 communicating therewith. The reservoir basin is provided with a base weir 23 adjacent the entrance of the downcomer 22 for maintaining a pool of predetermined height within the reservoir. An overflow weir 24 is provided in the forward face of the downcomer as a safety factor to prevent uncontrolled spillage, should the reservoir basin become too full. A pair of guide flanges 25, extending downwardly along the forward face of the downcomer, form a passageway for the overflow weir 24.

As shown particularly in FIGURE 5, the chute or downcomer 22 is slightly inclined with respect to the vertical. The degree of inclination of the downcomer is extremely important for delivering glass at a maximum rate without entrapping air. Angle A, being the angle which the downcomer makes with the vertical, is selected so that the molten glass flows downwardly along the lower inner surface of the downcomer to successively fill the downcomer from the bottom upwardly without pocketing or entrapping air. I have found that optimum flow conditions are achieved when angle A is about 15°. When angle A is less than 10° air has a tendency to become entrapped within the glass during its downward flow, thus producing seeds, whereas when the angle is larger than 20° an excessively large structure is necessitated for delivery and flow is materially reduced due to impedance. A constant head, depending upon the desired rate of flow, is maintained in downcomer 22.

A plurality of separators or dividers in the form of tubes 26 extend downwardly from and are secured to the bottom of the downcomer 22 along its longitudinal extent. The tubes 26 form a plurality of spaced-apart glass delivery passageways having air spaces therebetween.

As shown particularly in FIGURE 3, the tubes 26 may be arranged along a plurality of laterally spaced-apart susbtantially parallel longitudinal lines, with the tubes in each longitudinal line being staggered or longitudinally offset with respect to the tubes in the adjacent longitudinal line. Where a plurality of rows of such tubes are utilized, it is necessary to taper the tube openings along the outside rows so that a single line of streams is presented along the bite of the rollers.

Referring now to FIGURE 6, a transverse sectional view through a fragmental portion of the downcomer 22 shows two stream feeding tubes 26, secured onto a bottom plate 22a of the downcomer 22. Angle B represents the inclination of the opening 27 with respect to the horizontal. The extended opening created by the angle of inclination tends to pull the glass G toward the center line between the tubes 26 so as to form a single line of delivery to the forming rolls. I have found that optimum results are produced by maintaining angle B at approximately 75°. When the angle is decreased below 65° the glass tends to pull away from the center line creating two discrete lines of streams. The maximum angle which may be utilized is limited only by the structural capabilities of producing such an opening. The short side wall portion 28 of the tube 26 should be maintained at a minimum length so as to lessen impedance in the tube and thereby decrease the head necessary to draw glass therethrough. The opening 27 could be made with a planar cut as shown in FIGURE 6, or it could be concave in nature.

Referring now to the embodiments shown in FIGURES 7–10, a stream feeder 30 is shown having a reservoir basin 31, a downcomer or chute in the form of an open lip 32, and separators or dividers in the form of a plurality of plates 33 secured to the lower end of the chute. A weir 34, forming the forward face of the reservoir basin has a plurality of upwardly extending spacer plates 35, secured together along their upper ends by a tie bar 36. Plates 35 form a plurality of spillways or passages 37 for delivering and metering molten glass to the chute or lip 32. The weir 34 and spillways 37 are bounded by a pair of guide flanges 38 which extend downwardly along the side edges of the chute or lip 32, forming side walls therefor.

A plurality of partition strips 39, each in alignment with a spacer plate 35, extend downwardly from the top of the weir 34, along the upper surface of the inclined base of the lip 32, and project downwardly below the lower edge 32a of the inclined base to form a plurality of delivery passages 40. The partition strips 39 have a vertically extending or uniform impedance portion 41 and an inclined or converging portion 42. The uniform impedance portion 41 must be of sufficient length to maintain each of the metered molten glass streams in the delivery passages 40 with an equal flow rate. I have found, for example, that for glass having a viscosity of 100 poises a minimum of one inch is necessary to insure an equal flow rate in each of the passages. The inclined or converging portion 42 functions to size the overall width of the various streams to the desired predetermined width to be delivered to the forming rolls.

A plurality of divider or spacer plates 33 are secured to the lower ends of the guide flanges 38 and partition strips 39 by means of spacer bars 43. The lower ends of the flanges 38 and strips 39 are retained in predetermined spaced-apart position by means of tie bars 46. The bars have been omitted from FIGURE 8 for the purposes of clarity. The spacer bars 43 and divider plates 33 provide a plurality of delivery channels 44 separated by air spacers 45 positioned therebetween. The minimum distance D provided by the spacer bars 43 between adjacent divider plates 33, secured to each partition strip 39, is critical since such plates must be spaced apart a sufficient distance so that the glass flow through each of the delivery channels 44 will not coalesce at the tip of the plates 33, but will be delivered in the form of a plurality of separate or individual streams.

I have found, for example, that the distance D must be at least 3/16 of an inch for glass having a viscosity of 100 poises in order to form a plurality of separate or individual streams as the glass leaves the lower end of the plates 33. As shown particularly in FIGURES 9 and 10, the downwardly inclined converging lower surfaces 33a of the parallel delivery plates 33 provide a stream delivery of molten glass G without end restraint.

The delivery system of the instant invention was devised for low viscosity glasses having a range of about 10 to 300 poises. Glass having a viscosity of below 10 poises would have a surface tension which would tend to break-up the stream and form droplets, resulting in the production of unsatisfactory sheet; whereas, glass having a viscosity of over 300 poises would, unless the apparatus were greatly enlarged, be relatively viscous and tend to clog-up in the delivery apparatus. If glass having a viscosity of approximately 100 poises were fed from a rectangular orifice, the sheet flowing from such orifice would attenuate into a rounded stream in approximately 4 inches, thus providing inadequate feeding to forming rolls. The present apparatus, eliminates the disadvantages of such attenuation by providing a plurality of separate or individual streams across the bite of a pair of forming rolls so as to form a continuous uniform pool along the entire width of the bite.

In operation, molten low viscosity glass is fed from a suitable source to the reservoir basin of the stream feeder, preferably by means of a submerged delivery tube. The molten glass then flows over the weir at the forward end of the reservoir basin into and downwardly along the inclined chute. The separators or dividers secured to the lower end of the chute deliver a plurality of individual or separate streams of molten glass to and along the entire width of the bite of a pair of forming rolls positioned in vertical spaced-apart relationship therebelow. If it appears that a greater quantity of glass is flowing from one side of the divider than the other, the entire firebox, in which the feeder is positioned, may be pivoted about the trunnions or pivot means 19, whose axis of rotation is normal to the plane formed by the plurality of individual streams, so that the reservoir basin will have a lesser head adjacent the side of the weir where the flow had been greater. Accordingly, flow may be balanced along the entire width of the divider by pivoting the firebox about the trunnions and relatively adjusting the head of molten glass above the various delivery streams.

Although I have disclosed the now preferred embodiments of my invention, it will be readily apparent to those skilled in the art that various changes and modifications may be made thereto without departing from the spirit and scope thereof as defined in the following claims.

I claim:
1. In the manufacture of sheet glass, apparatus for uniformly feeding a plurality of closely spaced streams of molten glass along the bite of a pair of sheet forming rolls positioned therebelow so as to form a continuous uniform pool along the length of the bite of such rolls which comprises, a hollow refractory housing, a container positioned within said housing for receiving and maintaining a pool of molten glass, a downwardly inclined chute communicating with said container for delivering glass from said pool downwardly therealong, weir means for maintaining the pool of molten glass in said container at a predetermined height and for overflowing molten glass from said pool into said chute, a plurality of spaced-apart dividers depending from the lower end of said chute and having tapered guide means for delivering a plurality of separate individual streams of molten glass substantially along the entire line contact of a pair of forming rolls positioned therebelow to produce a continuous pool of molten glass along such bite, and pivot means for pivoting said refractory housing and accordingly said pool-containing container about an axis extended substantially normal to a vertical plane passing through such line of contact so as to vary the head across such pool and relatively control the amount of flow delivered by the various dividers.

2. In the manufacture of sheet glass, a stream feeder for delivering molten glass to sheet forming means positioned in spaced-apart relationship therebelow in such a manner to form a continuous pool of molten glass along a line extending substantially across the width of the forming means and thus eliminating the undesirable effect of attenuation during such feeding which comprises, a reservoir basin for retaining a pool of molten glass, an inclined downcomer communicating at its upper end with said reservoir basin, a weir for maintaining a constant depth pool of molten glass within said reservoir basin and for evenly distributing glass from such pool to such downcomer, said downcomer having a closed lower end portion, a plurality of delivery tubes communicating with and depending from the lower end portion of said downcomer for delivering a plurality of individual spaced-apart streams to the forming means, and said tubes having diagonally-extending lower open end portions for directing such streams along a line extending substantially across the forming means so as to form a continuous pool of molten glass along such line means.

3. Apparatus as defined in claim 2 wherein said delivery tubes are positioned along a pair of substantially parallel lines extending along the lower end portion of said downcomer, and the plane of the diagonally opened lower end portions of said delivery tubes along one parallel line is downwardly converging with the plane of the diagonal openings of the tubes in the adjacent line.

4. In the manufacture of sheet glass, improved apparatus for stream feeding molten glass along the desired width of sheet forming means positioned in spaced-apart relationship therebelow so as to maintain a continuous pool of molten glass along such width comprising, a container for retaining a pool of molten glass, a downwardly-inclined chute communicating with said container, a weir separating said chute and said container, a plurality of spaced-apart divider plates secured to and depending from the lower end of said chute forming a plurality of spaced-apart delivery channels having air pockets therebetween, a plurality of partition members extending along said chute and forming a plurality of delivery passages communicating at their upper ends with said weir and at their lower ends with said delivery channels; a plurality of spillways formed above said weir, each communicating with a delivery passage for feeding molten glass from said container to such passage; said divider plates being spaced-apart a distance sufficient to form a plurality of separate individual streams of molten glass which cannot coalesce during free flow; and converging edge portions on said divider plates directing such streams to contact sheet forming means positioned therebelow across a desired width thereof to form a continuous pool of molten glass therealong.

References Cited by the Examiner

UNITED STATES PATENTS

| 2,565,941 | 8/1951 | Barnard | 65—4 |
| 2,900,252 | 8/1959 | Woodward | 65—1 |
| 3,070,981 | 1/1963 | Frickert | 65—4 |

FOREIGN PATENTS

| 359,358 | 2/1938 | Italy | 65—2 |

DONALL H. SYLVESTER, *Primary Examiner.*

D. CRUPAIN, *Assistant Examiner.*